(12) United States Patent
Ogiso et al.

(10) Patent No.: US 11,275,287 B2
(45) Date of Patent: Mar. 15, 2022

(54) SEMICONDUCTOR MACH-ZEHNDER OPTICAL MODULATOR AND IQ OPTICAL MODULATOR USING SAME

(71) Applicant: Nippon Telegraph and Telephone Corporation, Tokyo (JP)

(72) Inventors: Yoshihiro Ogiso, Musashino (JP); Yuta Ueda, Musashino (JP); Josuke Ozaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/051,532

(22) PCT Filed: Apr. 18, 2019

(86) PCT No.: PCT/JP2019/016592
§ 371 (c)(1),
(2) Date: Oct. 29, 2020

(87) PCT Pub. No.: WO2019/211991
PCT Pub. Date: Nov. 7, 2019

(65) Prior Publication Data
US 2021/0232016 A1    Jul. 29, 2021

(30) Foreign Application Priority Data

May 1, 2018  (JP) .............................. JP2018-088409

(51) Int. Cl.
*G02F 1/21* (2006.01)
*G02F 1/225* (2006.01)

(52) U.S. Cl.
CPC ............ *G02F 1/212* (2021.01); *G02F 1/2255* (2013.01); *G02F 1/2257* (2013.01)

(58) Field of Classification Search
CPC ..... G02B 6/2813; G02F 1/212; G02F 1/2255; G02F 1/2257
(Continued)

(56) References Cited

U.S. PATENT DOCUMENTS

| | | | |
|---|---|---|---|
| 2009/0185774 A1* | 7/2009 | Kiyota | G02B 6/122 385/14 |
| 2012/0027337 A1* | 2/2012 | Kondou | G02B 6/29352 385/3 |

(Continued)

FOREIGN PATENT DOCUMENTS

| | | |
|---|---|---|
| JP | 2009-170710 A | 7/2009 |
| JP | 2011-186258 A | 9/2011 |

(Continued)

OTHER PUBLICATIONS

International Search Report dated Jul. 16, 2019, issued in PCT Application No. PCT/JP2019/016592, filed Apr. 18, 2019.

(Continued)

*Primary Examiner* — Michael P Mooney
(74) *Attorney, Agent, or Firm* — Workman Nydegger

(57) ABSTRACT

A Mach-Zehnder modulator is enabled to perform high-speed modulation operation by reducing RF loss of a high-frequency wiring formed on an optical waveguide without deteriorating optical characteristics of branching and multiplexing optical circuits. The Mach-Zehnder modulator includes a Mach-Zehnder (MZ) optical waveguide including two arm waveguides, a 1×2 multimode interference coupler composed of a semiconductor that splits and distributes input light to the two arm waveguides, a 2×1 multimode interference coupler composed of a semiconductor that multiplexes light from the two arm waveguides, and phase modulation means for giving a phase difference to the light that propagates through the two arm waveguides, wherein the 1×2 multimode interference coupler and the 2×1 multimode interference coupler are formed in a high-mesa structure, and higher mode light radiation means for radiating higher mode light is connected to only the 2×1 multimode interference coupler among the two multimode interference couplers.

7 Claims, 8 Drawing Sheets

(58) Field of Classification Search
USPC .................................. 385/1–3, 27–29, 45, 46
See application file for complete search history.

(56) References Cited

U.S. PATENT DOCUMENTS

2013/0064492 A1* 3/2013 Ishikawa ............ G02B 6/12007
385/2
2015/0286108 A1* 10/2015 Prosyk .................. G02F 1/0123
385/3
2015/0293427 A1 10/2015 Goi et al.

FOREIGN PATENT DOCUMENTS

| JP | 2017-111238 A | 6/2017 |
| JP | 2017-111338 A | 6/2017 |
| WO | 2014/104309 A1 | 7/2014 |

OTHER PUBLICATIONS

R. A. Griffin et al., *InP Coherent Optical Modulator with Integrated Amplification for High Capacity Transmission*, Optical Fiber Communications Conference and Exhibition (OFC), Mar. 22, 2015, pp. 1-3.

* cited by examiner

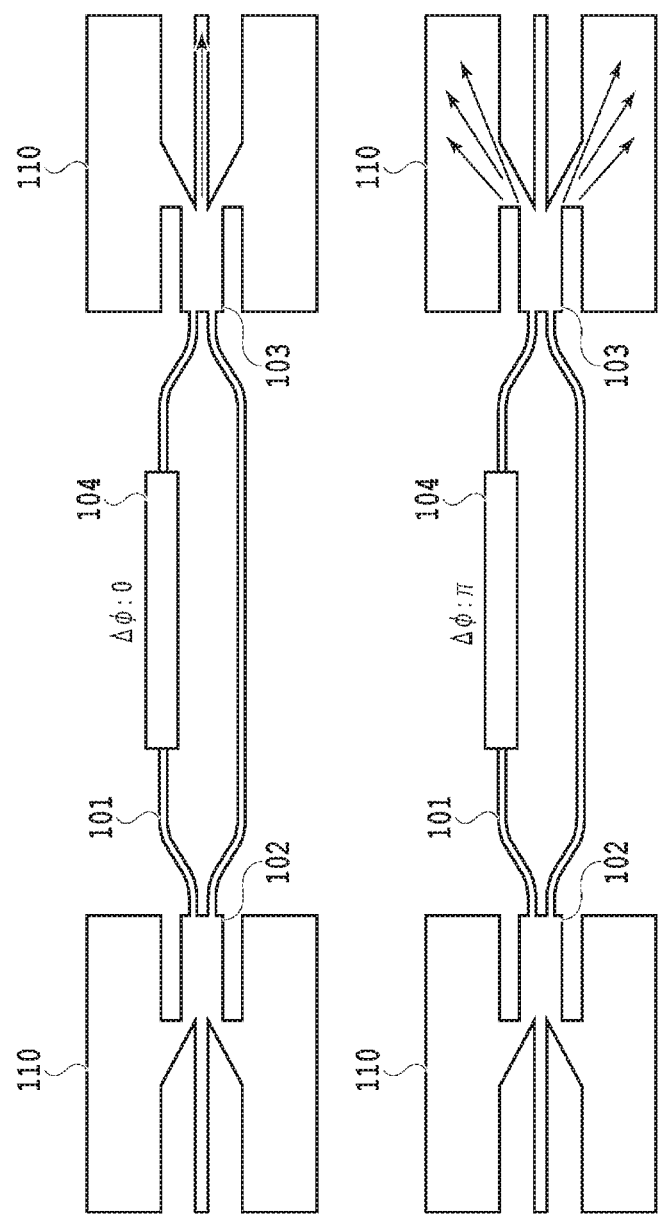

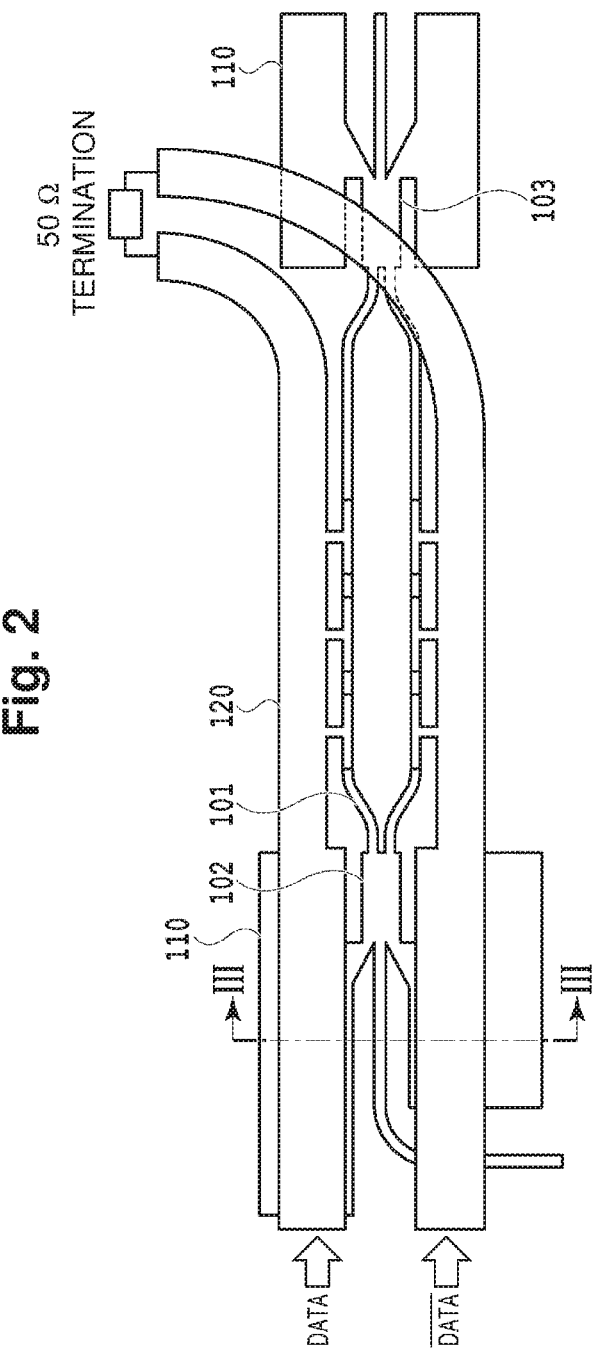

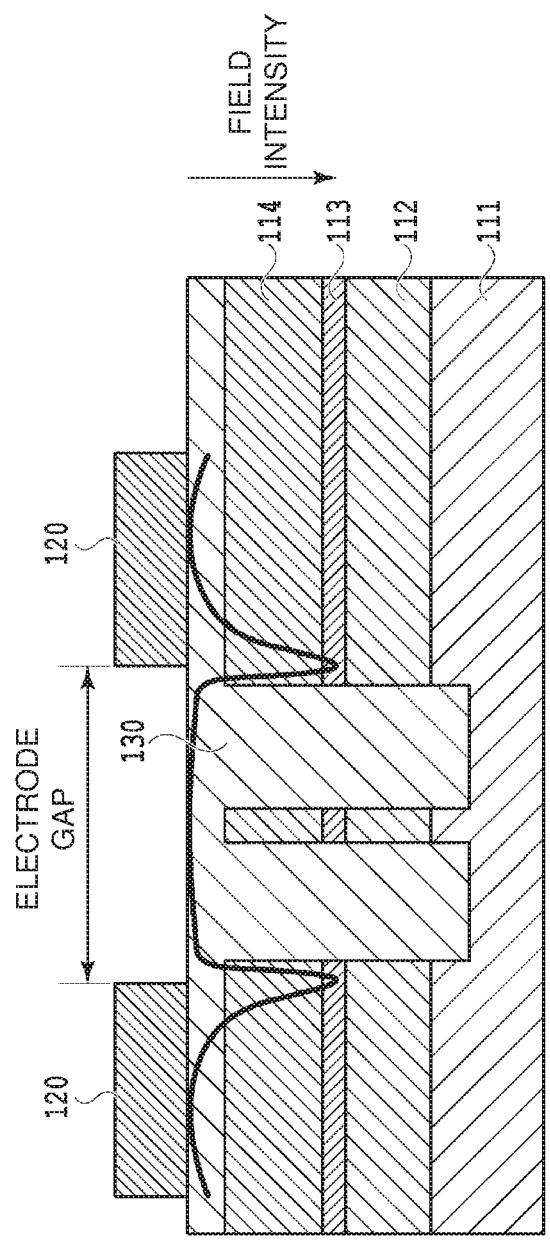

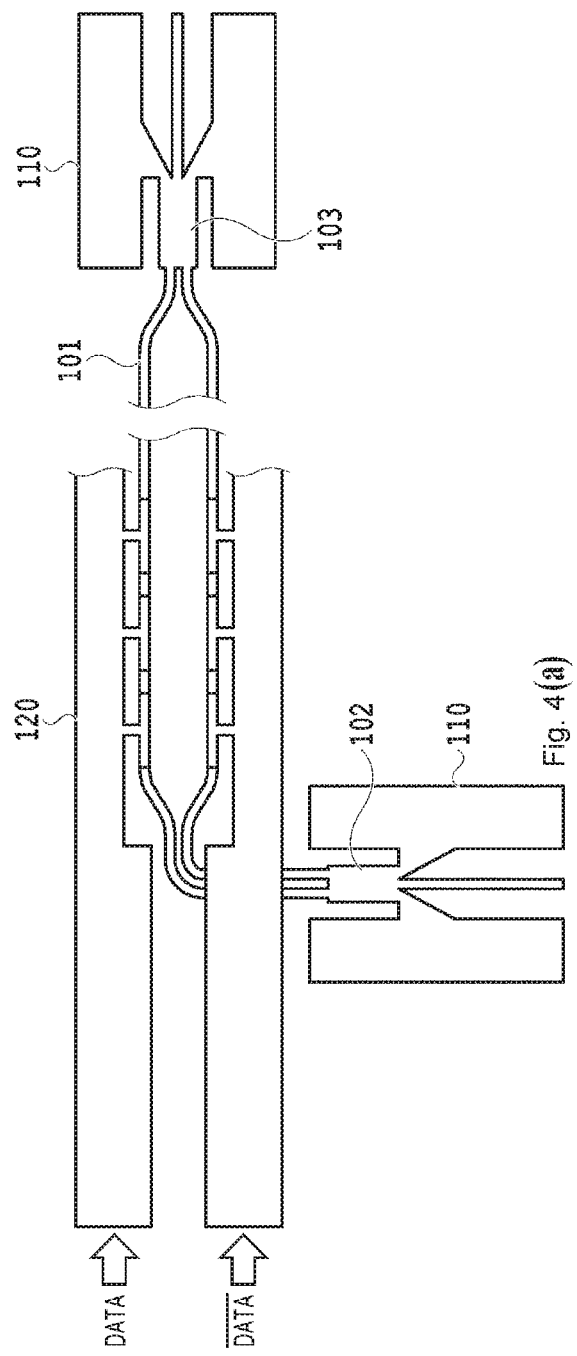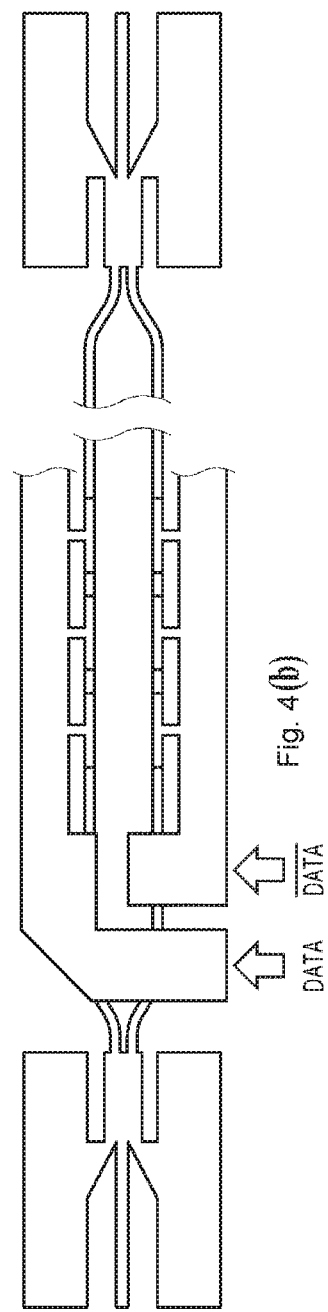

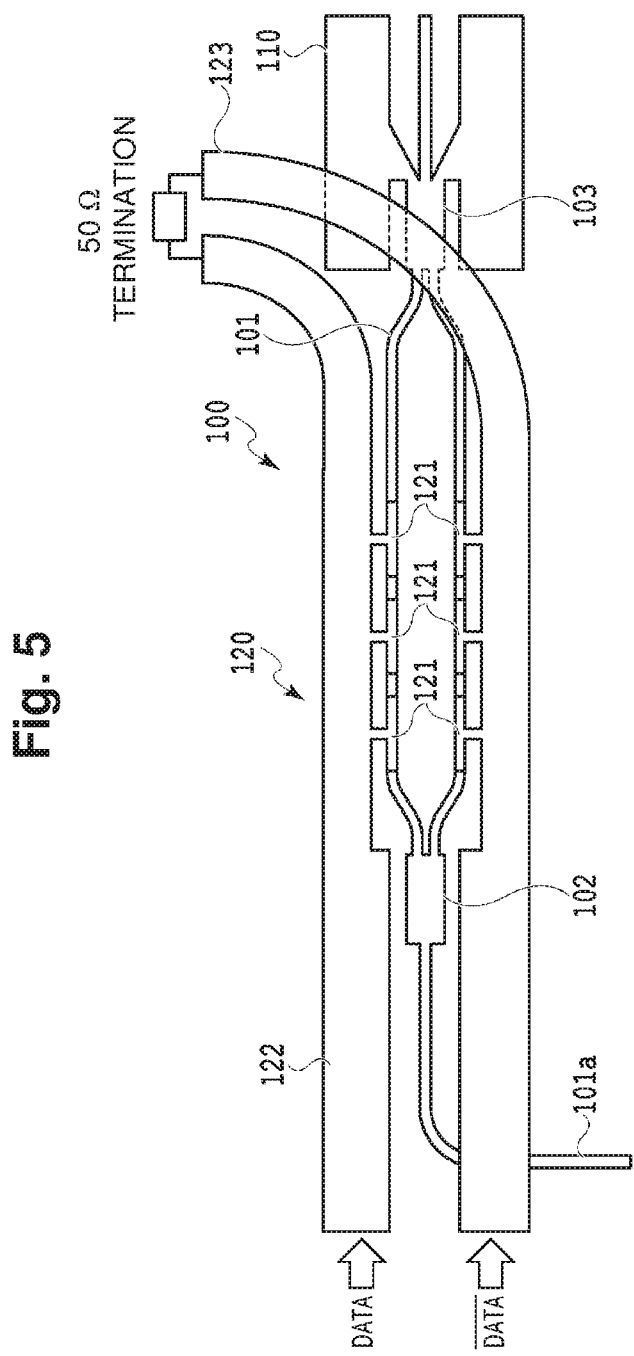

Fig. 6
DEMULTIPLEXING CHARACTERISTIC (TRANSMISSION) OF 1×2 MMI
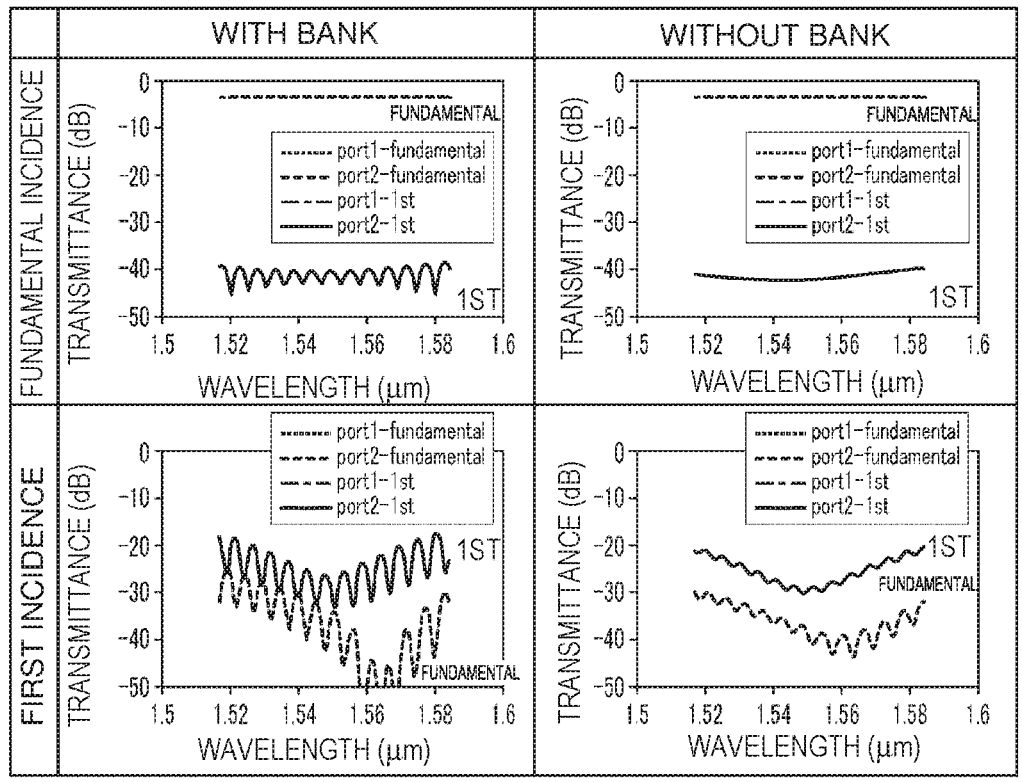
DEMULTIPLEXING CHARACTERISTIC (REFLECTION) OF 1×2 MMI
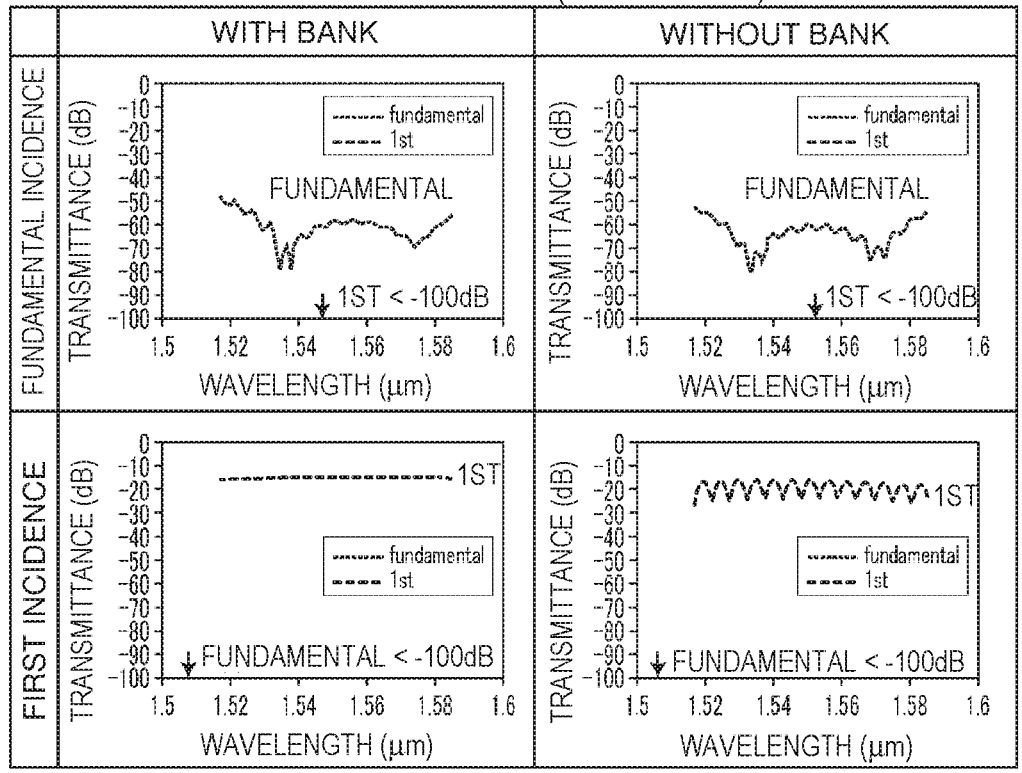

SEMICONDUCTOR MACH-ZEHNDER OPTICAL MODULATOR AND IQ OPTICAL MODULATOR USING SAME

TECHNICAL FIELD

The present invention relates to a Mach-Zehnder modulator, and more particularly a Mach-Zehnder modulator capable of high-speed operation with low optical and electrical loss.

BACKGROUND ART

In recent years, optical modulators using compound semiconductor materials have been actively researched and developed against a backdrop of miniaturization and high speed of optical modulators. An optical modulator using InP as a substrate material among others can perform highly efficient modulation operation utilizing a quantum confined Stark effect or the like in a communication wavelength band, and thus InP is drawing attention as a promising modulator material that replaces conventional ferroelectric materials.

The proposed semiconductor optical modulators include an InP/InGaAsP optical modulator that uses a hetero pin junction to confine light and effectively apply voltage to a core portion of an optical waveguide, and an npin-type semiconductor optical modulator structure in which both InP cladding layers are made n-type and a thin p-type semiconductor layer (p-type barrier layer) is inserted as a barrier layer for suppressing an electron current in order to produce an optical modulator driven by a further lowered voltage.

In any structure, a material to which an n-type or p-type dopant is added is used for a cladding layer of the optical waveguide, and structural design of the doped layer is closely related to optical and electrical characteristics. In general, optical waves and high-frequency waves (microwaves) are common as electromagnetic waves and their electromagnetic fields consume energy due to interaction with carriers (electrons and holes) in the dopant. That is, for example, if a high-concentration doped cladding layer is provided adjacent to an optical waveguide core layer, a large optical loss may occur, and if a doped layer is provided immediately under a high-frequency wiring, a high-frequency loss may increase.

An MZM (Mach-Zehnder Modulator) generally makes a traveling wave (distributed constant) high-frequency electrode and an optical waveguide run parallel, and uses an electro-optical effect there to achieve a high-speed and efficient optical modulation operation. Here, it is desirable that high-frequency energy fed from a feeding pad at a chip end is fed to an optical modulation region without loss. That is, how low the loss of a lead-out line for feeding can be designed greatly affects high-speed operation.

On the other hand, due to the structure of the MZM, it is necessary that the optical waveguide and the lead-out line for signal feeding intersect or run parallel at at least one place or more, and in this case, as described above, the doped layer in the optical waveguide increases RF loss of the lead-out line in the proximity.

Thus, it is required how to reduce the doping concentration of the doped layer or how to reduce a cubic volume of the doped layer (how to reduce interaction with the electromagnetic field) from a viewpoint of high frequency.

CITATION LIST

Non-Patent Literature

Non-Patent Literature 1: InP Coherent Optical Modulator with Integrated Amplification for High Capacity Transmission, OFC2015, Th4E.2 (2015)

SUMMARY OF THE INVENTION

Technical Problem

However, since the MZM is required to have certain specifications for not only high-frequency characteristics but also optical characteristics such as optical loss and an extinction ratio, if the form of the doped layer or the like is carelessly changed from the viewpoint of high-frequency characteristics, optical characteristics may be deteriorated.

Typically, in the MZM, a 1×2 or 2×2 MMI coupler is used for an optical branching or multiplexing circuit. Since the 1×2 MIMI coupler which is excellent in symmetry among others is excellent in a broadband property of the multiplexing/demultiplexing characteristics, adopting the 1×2 MIMI coupler has become a main stream in the MZM as long as there is no need to add functionality as a special optical circuit (for example, Non-Patent Literature 1).

When the 1×2 MMI coupler is formed with a high-mesa waveguide, a problem arises regarding radiation of higher modes. The high-mesa waveguide confines a lateral direction with air and is a waveguide that very strongly confines light. Therefore, although it is desired to radiate light as an interference waveguide, the higher modes are not radiated but reflected within the coupler, and optical characteristics (in particular, wavelength dependency of the loss and extinction ratio) are deteriorated as a result. Specifically, it is found in principle from a mode calculation that an optical power of about −10 dB is reflected to an arm before multiplexing and the extinction ratio is deteriorated to about 20 dB. In order to prevent this characteristic deterioration, in the 1×2 MIMI coupler, typically a bank that promotes radiation of the higher modes is connected to part of the MIMI coupler (for example, four corners of the coupler), which prevents the higher modes from reflecting inside the coupler.

FIG. 1 shows a waveguide outline of a conventional MZM using the 1×2 MMI (Multi-Mode Interference) coupler. FIG. 1 shows MMI couplers 102 and 103 provided with a bank 110 at an input and output of a Mach-Zehnder (MZ) optical waveguide 101. On one arm of the optical waveguide 101, phase modulation means 104 that modulates a phase Δϕ is provided. When the phase Δϕ is 0, light couples to an output waveguide, but when the phase Δϕ is π, light radiates to the bank 110, and reflection into the MMI coupler 103 is suppressed.

However, in order for such a bank to promote the radiation of light and suppress the reflection to the coupler, it is required to have a certain pattern width. Specifically, the bank is required to have a pattern width of 5 μm or more at the minimum, and as a result of that, RF loss of the lead-out line provided in the vicinity of the coupler will increase since a semiconductor layer remaining as the pattern includes the doped layer.

FIG. 2 is a diagram showing a configuration example of the conventional MZM that modulates with a traveling wave electrode, and FIG. 3 is a sectional view taken along a line in FIG. 2. As shown in FIG. 3, the bank 110, as in the other waveguide regions 101, 102, and 103, can be made to have a high-mesa configuration in which an n-doped InP cladding layer 112, a non-doped core layer 113, and a p-doped InP cladding layer 114 are sequentially stacked on a substrate 111. A semiconductor region is covered with an organic film 130. For example, as shown in FIG. 2, when optical waveguides or the like intersect or run parallel between high-frequency lines 120, there is a region where field intensity is concentrated as shown in FIG. 3 immediately under the high-frequency lines 120 serving as two coupling lines. When a semiconductor doped layer overlaps with the region, the high-frequency loss conspicuously increases. In FIGS. 2 and 3, the bank 110 overlaps with the region where field intensity concentrates. Also from the above, it is not easy to make design that achieves improvement of both optical characteristics and high-frequency characteristics in the MZM using the 1×2 MMI coupler.

Adopting a configuration in FIG. 4(a) or (b) can solve the problem of overlapping between the region where field intensity is concentrated and the doped layer, but in (a), there is a concern that bending MZ arm waveguides may deteriorate optical characteristics and increase chip area, and in (b), there is a concern that bending lead-out feed lines may generate a common mode or the like when a differential signal is input, so it is hardly said to be a true solution.

The present invention has been made in view of the above conventional problems, and a problem of the present invention is to enable high-speed modulation operation by reducing RF loss of a high-frequency wiring formed on an optical waveguide without deteriorating optical characteristics of branching and multiplexing optical circuits in a Mach-Zehnder modulator.

Means for Solving the Problem

In order to solve the above problem, a Mach-Zehnder modulator according to one embodiment of the present invention includes a Mach-Zehnder (MZ) optical waveguide including two arm waveguides, a 1×2 multimode interference coupler composed of a semiconductor that splits and distributes input light to the two arm waveguides, a 2×1 multimode interference coupler composed of a semiconductor that multiplexes light from the two arm waveguides, and phase modulation means for giving a phase difference to the light that propagates through the two arm waveguides, wherein the 1×2 multimode interference coupler and the 2×1 multimode interference coupler are formed in a high-mesa structure, and higher mode light radiation means for radiating higher mode light is connected to only the 2×1 multimode interference coupler among the two multimode interference couplers.

BRIEF DESCRIPTION OF DRAWINGS

FIG. 1 is a diagram showing a waveguide outline of a conventional MZM semiconductor optical modulation element.

FIG. 2 is a diagram showing the conventional MZM semiconductor optical modulation element in which optical waveguides or the like intersect or run parallel between high-frequency lines.

FIG. 3 is a sectional view taken along a line in FIG. 2.

FIG. 4(a) is a diagram showing a configuration example of a bent input waveguide in the conventional MZM semiconductor optical modulation element, and (b) is a diagram showing a configuration example of a bent high-frequency line in the conventional MZM semiconductor optical modulation element.

FIG. 5 is a diagram showing a configuration example of a semiconductor optical modulation element of an embodiment.

FIG. 6 is a diagram showing optical characteristic variations depending on whether there is a bank in an input side 1×2 MIMI coupler (demultiplexer).

DESCRIPTION OF EMBODIMENTS

Hereinafter, an embodiment of the present invention will be described in detail.

FIG. 5 is a diagram showing a configuration example of a semiconductor optical modulation element of the embodiment. The semiconductor optical modulation element of the embodiment is configured as a Mach-Zehnder modulator (MZM) having a configuration in which a 1×2 multimode interference (MMI) coupler 102 and a 2×1 MMI coupler 103 are provided at an input and output of a semiconductor MZ (Mach-Zehnder) optical waveguide 101, respectively. In the semiconductor optical modulation element of the embodiment, the 1×2 MMI coupler 102 as an optical branching circuit at the input of the MZM does not have a semiconductor bank pattern, whereas the 2×1 MMI coupler 103 as an optical multiplexing circuit at the output has the semiconductor bank pattern.

The "bank" here refers to a so-called slab-type optical waveguide and is an optical waveguide extracted from part of the MIMI coupler in a prescribed direction (for example, an oblique direction) and connected. For example, it can be used to radiate light (higher mode light) that is diffusely reflected and returned without being coupled to a desired optical waveguide.

Here, in the semiconductor optical modulation element of the embodiment, a reason why the bank is provided only for the MIMI coupler of the optical multiplexing circuit and the bank is not provided for the MIMI coupler of the optical demultiplexing circuit will be described with reference to FIGS. 6 and 7.

FIG. 6 is a diagram showing optical characteristic variations depending on whether there is a bank in the input side 1×2 MMI coupler (demultiplexer) 102. FIG. 7 is a diagram showing optical characteristic variations depending on whether there is a bank in the output side 2×1 MIMI coupler (multiplexer) 103. The optical characteristic variations in FIGS. 6 and 7 were obtained by mode calculation. In FIG. 7, "A" indicates an output of fundamental mode light, "B" indicates an output of first mode light, "C" indicates reflection of the fundamental mode light to arms, and "D" indicates reflection of the first mode light to the arms.

As shown in FIG. 6, in the optical demultiplexer 102, no noticeable attenuation due to the presence or absence of the bank was recognized in a range of at least the fundamental and first modes, and no peculiar difference (optical characteristic variation) due to the presence or absence of the bank was observed. That is, according to FIG. 6, it can be confirmed in principle that there is no optical characteristic problem even if no bank is provided in the optical demultiplexer 102.

Figure 7:
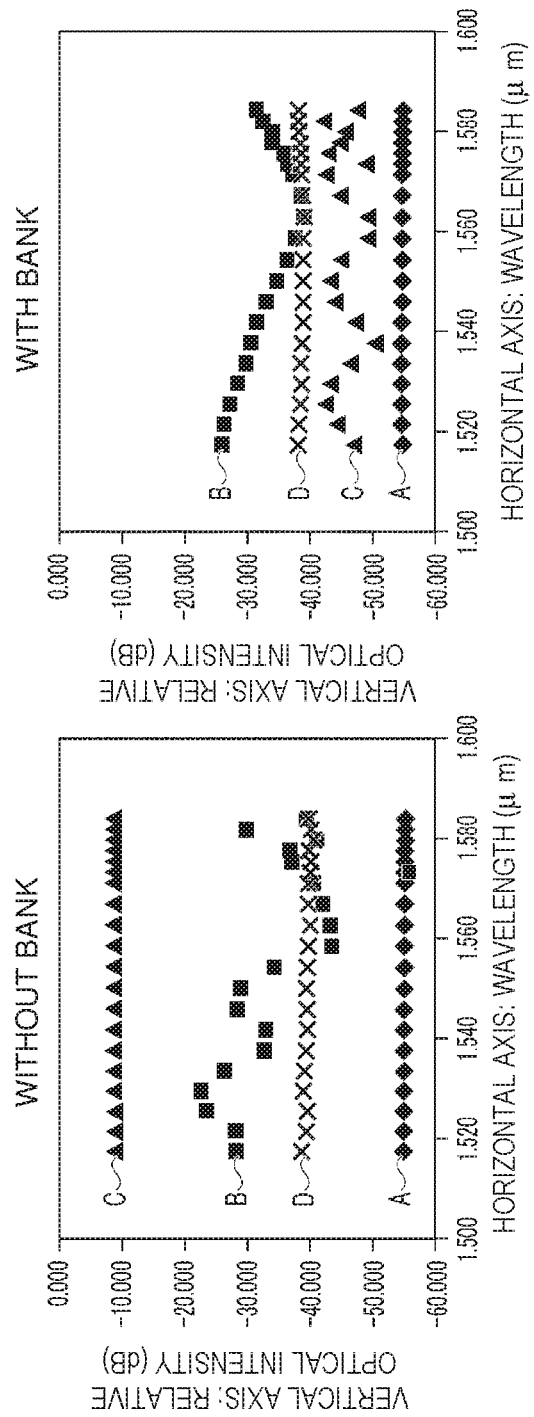
FIG. 7 is a diagram showing optical characteristic variations depending on whether there is a bank in an output side 1×2 MIMI coupler (multiplexer).

On the other hand, according to FIG. 7, regarding the optical multiplexer 103, although deterioration in transmission characteristics is not noticeably seen, a reflection of maximum −10 dB is generated in principle as reflection characteristics, and it can be estimated that the extinction ratio also decreases to nearly 20 dB. Therefore, the optical multiplexer 103 needs to be provided with the bank.

Returning to FIG. 5, the semiconductor optical modulation element of the embodiment further includes a traveling wave electrode 121 formed such that propagation directions of an optical wave and a microwave (RF) in the modulation region match above the MZ optical waveguide 101. A lead-out feed line 122 for feeding an RF signal for modulation to the traveling wave electrode 121 is provided in the vicinity of the optical demultiplexer MMI coupler 102 situated on the light incident side, and an RF signal electrode line 123 propagating the RF signal that has passed through the modulation region is provided in the vicinity of a subsequent optical multiplexer MMI coupler 103. It is desirable that the lead-out feed line 122 is linear and the lead-out feed line 122 and the optical waveguide 101 of a modulation unit have the same stripe direction.

Because the RF signal that has passed through the modulation region is then converted into thermal energy via a termination resistor, even if electric loss increases on the line on the way, an impact on the modulation characteristics is small as long as line impedance does not change significantly. It is possible on design to make the high-frequency line itself distant from a subsequent multiplexing MMI coupler (reduce an impact of RF loss) by bending the line after passing through the modulation region (on the RF incident side, a bent line is not desirable from viewpoints of loss and skew, but after passing through the modulation region, characteristic deterioration due to bending is small by optimal designing), or providing the termination resistor immediately after the modulation region. From such a viewpoint, it is desirable that in the configuration of the MZM semiconductor optical modulation element with high-speed operation and little optical characteristic deterioration, the lead-out feed line 122 is linear and the lead-out feed line 122 and the optical waveguide 101 of the modulation unit have the same stripe direction.

EXAMPLE 1

In Example 1, the same configuration as the MZM semiconductor optical modulation element of the above-described embodiment was specifically created. First, as a substrate, as a zinc-blende type compound semiconductor crystal, for example, a Fe-doped semi-insulating InP [crystal direction: 100] substrate was used. On the substrate, an n-type contact-cladding layer, a non-doped core-cladding layer, and a p-type cladding-contact layer were stacked in this order from a substrate surface by epitaxial growth.

The core layer of the core-cladding layer has a multi-quantum well structure having a period of InGaAsP/InGaAsP in order to efficiently use a refractive index change due to an electro-optic effect for a wavelength of a 1.5 μm band. A PL (Photo Luminescence) wavelength of the multi-quantum well is 1.4 μm.

Although a p-i-n-type hetero-structure from upward is used here, because the effect will appear if a waveguide includes a doped layer in the waveguide structure in the MZM semiconductor optical modulation element of the embodiment, it is obvious that there is a problem with a hetero-structure in which layers are stacked, for example, in the order of n-i-p, n-p-i-n, or n-i-p-n from upward.

The composition of the cladding layer of the core-cladding layer is made, for example, InP whose refractive index is lower than that of the core layer, and InGaAs that lattice-matches InP and has a small energy bandgap is used for an n-type contact layer and a p-type contact layer.

In the MZM semiconductor optical modulation element of the embodiment, since the compositions of the core and the cladding only need to have a relative refractive index difference, it is obvious that there is no problem in using InGaAlAs or the like which is a different composition for, for example, the core-cladding layer, the n-type cladding layer, and the p-type cladding layer.

In the MZM semiconductor optical modulation element of the embodiment, the wavelength is not limited to a 1.5 μm band, and, for example, even if a 1.3 μm band is used, the effectiveness of the configuration of the embodiment is not lost. That is, even if not only the InP substrate but also other semiconductor materials (such as GaAs) are used, the effectiveness of the configuration of the embodiment is not lost.

In order to electrically separate between electrodes, after removing the conductive p-type cladding layer and p-type contact layer other than the modulation region and a feeding pad region by dry etching and chemical etching, for example, a non-doped cladding layer (here, InP) is deposited by crystal regrowth.

Subsequently, the MZ optical waveguide 101 with a pattern shown in FIG. 5 is formed by dry etching using a SiO$_2$ mask. Here, as described above, the standalone 1×2 MMI coupler 102 is used for the optical demultiplexer, and the 2×1 MMI coupler 103 connected with the bank 110 for radiation is used for the optical multiplexer. Note that, the multiplexer and demultiplexer 102 and 103 have the high-mesa structure.

On the other hand, the effectiveness of the configuration of the embodiment does not change even if the optical waveguide of the modulation region does not have the high-mesa structure, for example, it is a so-called ridge waveguide in which a lower layer than the core layer is a slab waveguide. It should be noted that if the width of the high-mesa waveguides of the MMI couplers 102 and 103 becomes wide with respect to the electrode GAP shown in FIG. 3, there is a risk that a high electric field may overlap with the optical waveguides of the MMI couplers 102 and 103, which may cause RF loss increase; therefore, in this case, the width of the high-mesa waveguides must be designed to be equal to or less than the electrode GAP width or the optical waveguides themselves must be designed to be distant from the vicinity of the edge where field intensity between electrodes is concentrated. However, typically, the 1×2 MMI coupler has a waveguide width of 10 μm or less even when the optical waveguide is the widest, whereas the GAP of the high-frequency electrode line 120 formed thereon is set to 10 μm or more, so the above problem hardly occurs basically in the region of the 1×2 MMI coupler.

Then, unevenness of the optical waveguide is flattened with an organic film such as polyimide or benzocyclobutene (BCB), electrode pattering is performed thereon, and the high-frequency electrode 120 is formed by using an Au plating or the like. Here, a traveling wave distributed constant electrode is used for the high-frequency electrode 120 for high-speed operation. More preferably, using a capacity loaded traveling wave electrode that has a high degree of freedom in designing characteristic impedance and microwave speed enables further high speed.

The input signal is desirable to be a differential signal input from viewpoints of crosstalk, consumption power, and the like, but even if a single-phase signal is input, the effectiveness of the configuration of the embodiment is not lost. In the case of differential signal input, since it is required to equalize the lengths of differential lines from a viewpoint of skew, it is desirable that the feed lead-out line 122 has a straight line shape without being bent as shown in FIG. 5. In this case, an input optical waveguide 101a can be bent, instead. It is obvious that the effectiveness of the configuration of the embodiment does not change even if the structure in which the feed lead-out line 122 is bent is adopted.

Figure 8:
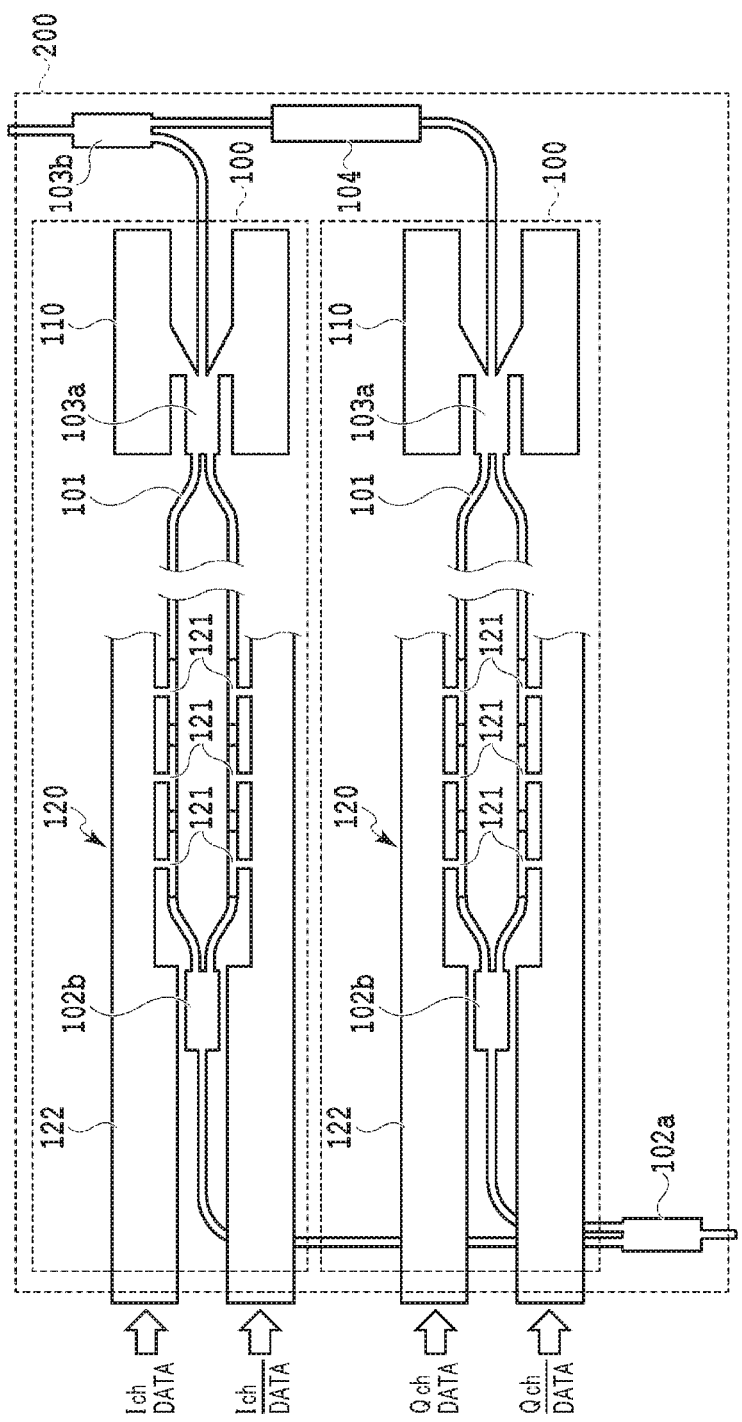
FIG. 8 is a diagram showing an IQ optical modulator in which a plurality of MZMs of the embodiment are integrated in parallel.

In the embodiment above, the single MZM is described, but similarly in an IQ optical modulator in which a plurality of MZMs are integrated in parallel as shown in FIG. 8, the configuration of the embodiment can be adopted in each MZM, that is, the configuration in which a 1×2 MMI coupler 102b as an optical branching circuit at the input of the MZM does not have the semiconductor bank pattern but the 2×1 MIMI coupler 103a as the optical multiplexing circuit at the output has the semiconductor bank pattern 110 can be adopted. It is obvious that the same effect is obtained by this configuration. Note that the RF signal electrode line 123 is omitted from being shown in FIG. 8.

The IQ optical modulator shown in FIG. 8 is a so-called nested MZM in which each arm of a master MZM 200 is composed of a slave MZM 100. Two electrode lines 121 that phase modulate an optical signal propagating through the MZM optical waveguide when a modulation signal is applied are provided along two arms constituting each of the slave MZM optical waveguides 101. The lead-out feed line 122 connected to the two electrode lines 121 and for inputting the modulation signal applied to the two electrode lines 121 is provided. Further provided are a first optical demultiplexer 102a for splitting and distributing light to the two arms of the master MZM optical waveguide, second optical demultiplexers 102b for splitting and distributing light to the two arms of the respective slave MZM optical waveguides, and first optical multiplexers 103a for multiplexing light from the two arms of the respective slave MZM optical waveguides. With respect to a stripe direction of the slave MZM optical waveguide with the two electrode lines 121 provided, a stripe direction of the lead-out feed line 122, a stripe direction of the second optical demultiplexer 102b, and a stripe direction of the first optical multiplexer 103a are the same, and a stripe direction of the first optical demultiplexer 102a has an orthogonal relationship. The IQ optical modulator shown in FIG. 8 may be formed with a two-parallel structure nested structure MZM (quad-parallel MZM). In FIG. 8, one phase modulator 104 is provided between the first optical multiplexers 103a and a second optical multiplexer 103b.

In the IQ optical modulator as shown in FIG. 8, making the lead-out feed line 122 into a straight line is useful in facilitating parallel integration of the MZMs. If the MZMs are integrated in parallel adopting a bent lead-out line without making the lead-out feed line 122 into a straight line, not only chip area unnecessarily increases but also lead-out line loss difference may occur between channels.

REFERENCE SIGNS LIST

100 Mach-Zehnder modulator (MZM)
101 MZ optical waveguide
102 Demultiplexing side MMI coupler
103 Multiplexing side MMI coupler
104 Phase modulator
110 Bank
111 On substrate
112 N-doped InP cladding layer
113 Non-doped core layer
114 P-doped InP cladding layer
120 High-frequency line
121 Traveling wave electrode
122 Lead-out feed line
123 RF signal electrode line
200 IQ optical modulator

The invention claimed is:

1. A Mach-Zehnder modulator comprising:
  a Mach-Zehnder (MZ) optical waveguide including two arm waveguides;
  a 1×2 multimode interference coupler composed of a semiconductor that splits and distributes input light to the two arm waveguides;
  a 2×1 multimode interference coupler composed of a semiconductor that multiplexes light from the two arm waveguides; and
  phase modulation means for giving a phase difference to the light that propagates through the two arm waveguides,
  wherein the 1×2 multimode interference coupler and the 2×1 multimode interference coupler are formed in a mesa structure, and higher mode light radiation means comprising a semiconductor bank pattern for radiating higher mode light is connected to only the 2×1 multimode interference coupler among the two multimode interference couplers.

2. The Mach-Zehnder modulator according to claim 1, wherein the phase modulation means is a traveling wave high-frequency wiring and gives the light a phase difference by applying and driving an optical modulation signal to the MZ optical waveguide.

3. The Mach-Zehnder modulator according to claim 2, wherein in the traveling wave high-frequency wiring, a feeding direction of the optical modulation signal is the same direction as an optical waveguide in an optical modulation region.

4. An IQ optical modulator, wherein at least two Mach-Zehnder modulators according to claim 1 are connected in parallel.

5. An IQ optical modulator in which at least two Mach-Zehnder modulators according to claim 2 are connected in parallel, further comprising:
  a preceding 1×2 multimode interference coupler whose two outputs are connected to inputs of two 1×2 multimode interference couplers of the two parallel Mach-Zehnder modulators,
  wherein with respect to a stripe direction of optical waveguides of the Mach-Zehnder modulators, a stripe direction of the traveling wave high-frequency wiring, a stripe direction of the two 1×2 multimode interference couplers, and a stripe direction of the two 2×1 multimode interference couplers connected in parallel are the same, and a stripe direction of the preceding 1×2 multimode interference coupler has an orthogonal relationship.

6. An IQ optical modulator, wherein at least two Mach-Zehnder modulators according to claim 2 are connected in parallel.

7. An IQ optical modulator, wherein at least two Mach-Zehnder modulators according to claim 3 are connected in parallel.

* * * * *